Dec. 20, 1960   L. A. KIRSCHNER ET AL   2,965,127
DRAIN TRAP
Filed June 30, 1958   3 Sheets-Sheet 1
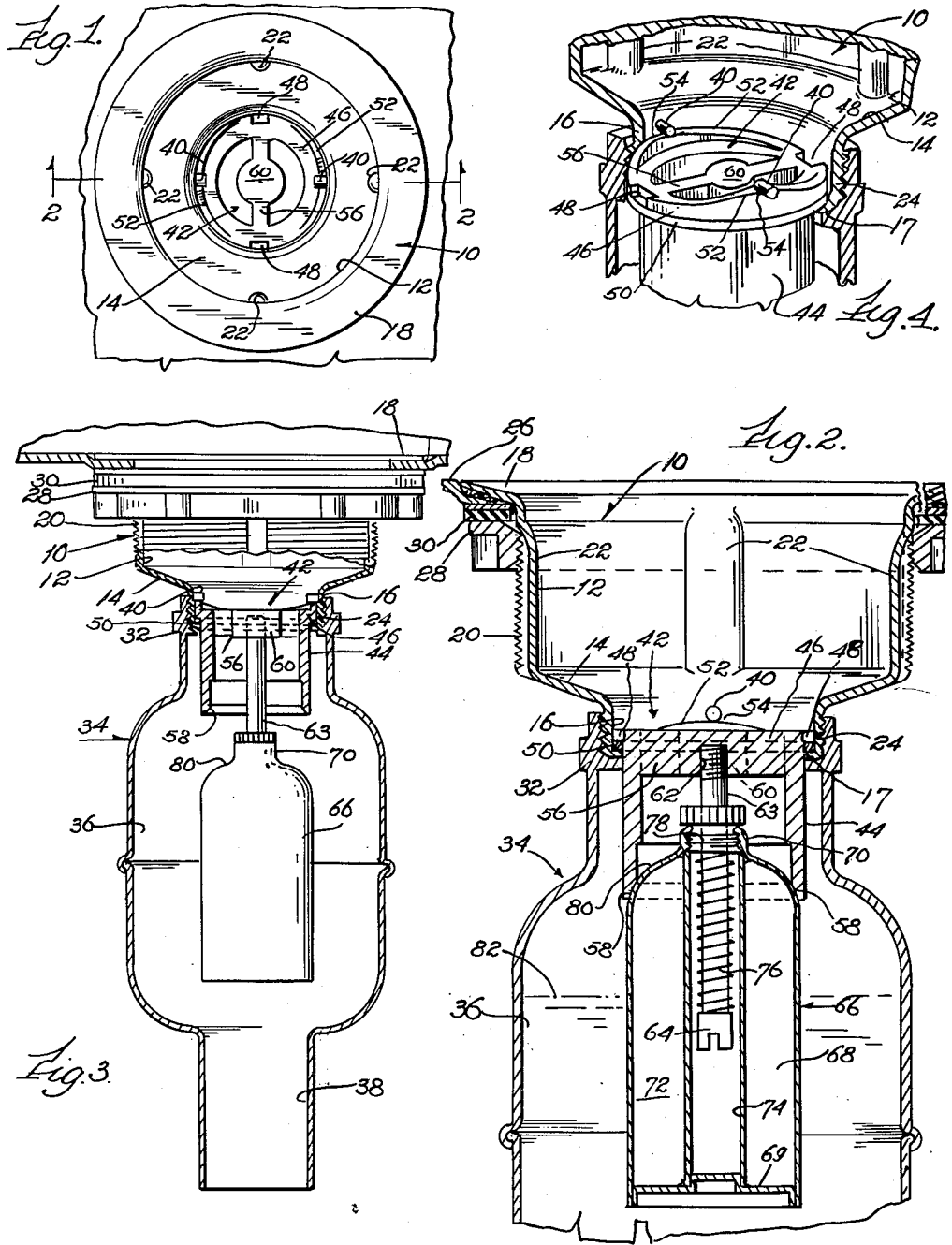
INVENTORS.
Louis A. Kirschner.
and Leon I. Kirschner,
BY May R. Fraser
Attorney.

Dec. 20, 1960  L. A. KIRSCHNER ET AL  2,965,127
DRAIN TRAP
Filed June 30, 1958  3 Sheets-Sheet 2
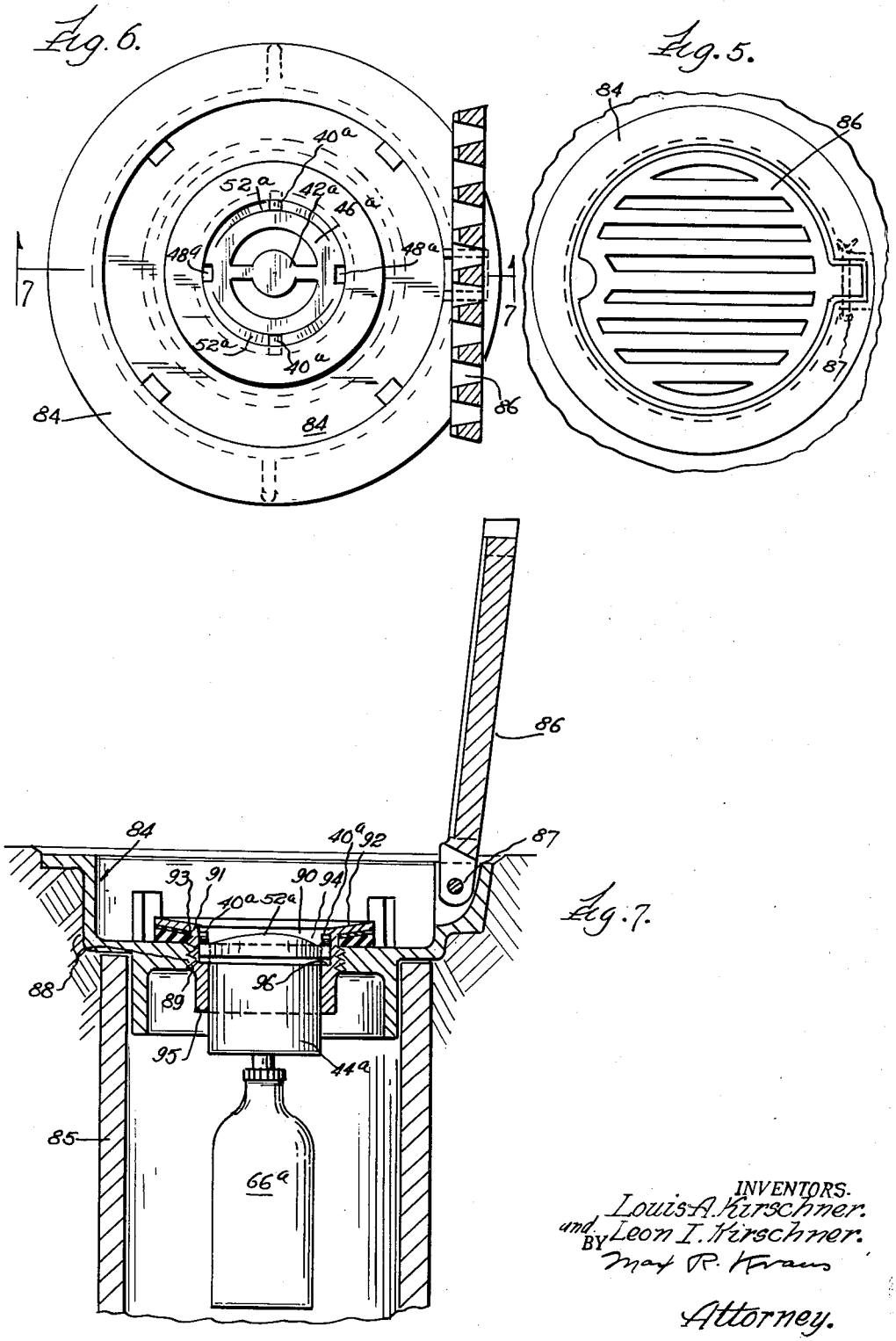
INVENTORS.
Louis A. Kirschner.
and Leon I. Kirschner.
BY
Max R. Kraus
Attorney.

Dec. 20, 1960 — L. A. KIRSCHNER ET AL — 2,965,127
DRAIN TRAP
Filed June 30, 1958 — 3 Sheets-Sheet 3
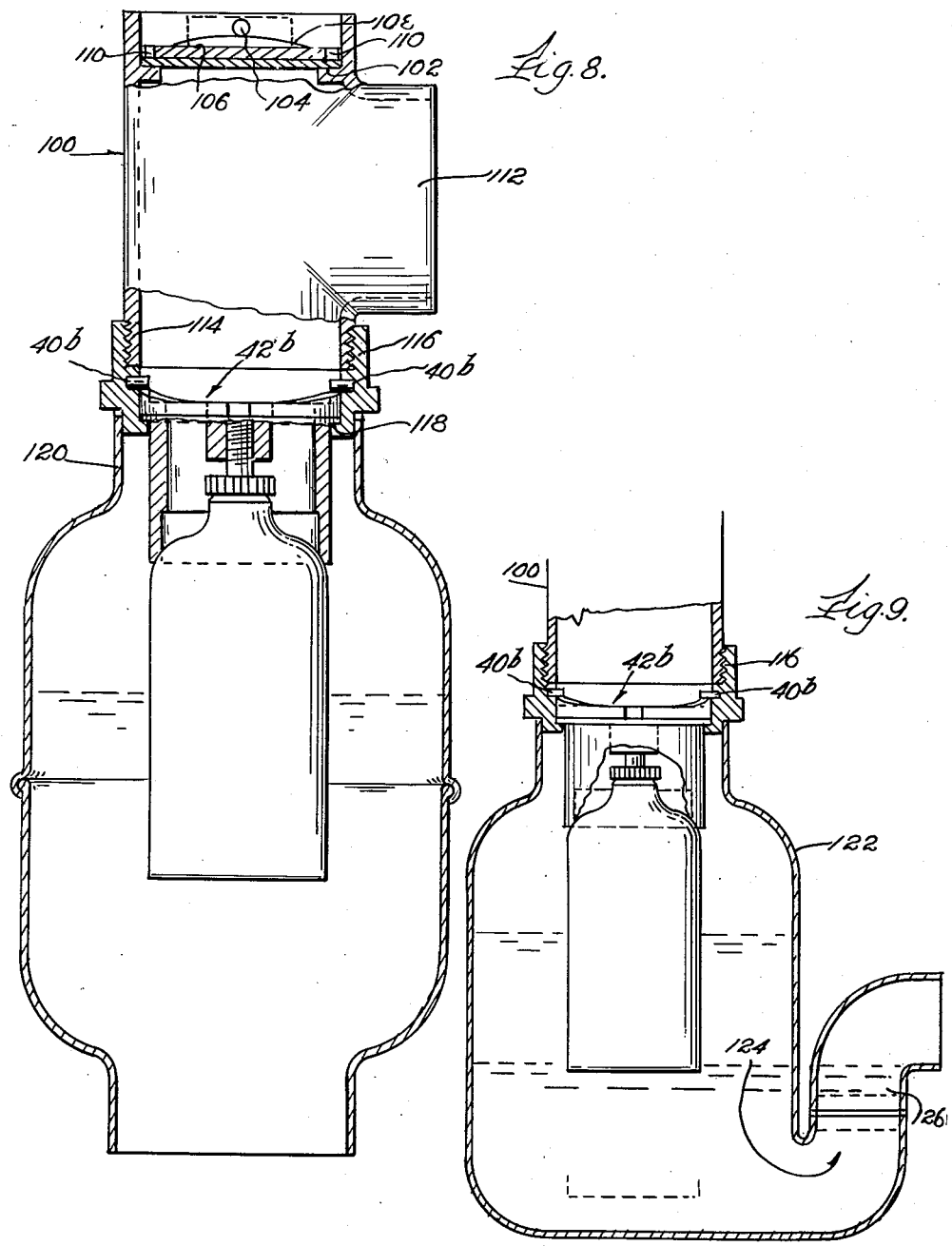
INVENTORS.
Louis A. Kirschner
and Leon I. Kirschner
BY Max R. Kraus
Attorney.

United States Patent Office 2,965,127
Patented Dec. 20, 1960

2,965,127

DRAIN TRAP

Louis A. Kirschner, 6758 N. Sheridan Road, Chicago, Ill., and Leon I. Kirschner, 7650 Lavergne Ave., Skokie, Ill.

Filed June 30, 1958, Ser. No. 745,562

2 Claims. (Cl. 137—424)

This invention relates to improvements in drain traps for use in automatically preventing any back flow through the traps or waste pipe, although permitting unrestricted normal passage of the water or fluid through the waste pipe into the sewer.

One of the objects of the present invention is to provide a drain trap or check valve assembly or unit which may be readily installed and locked in installed position without the use of threads and without the use of tools.

Another object of this invention is to provide a drain trap or check valve assembly provided with cammed surfaces which may be readily installed and secured in locked position by a mere rotation of the drain trap assembly and which may be readily removed for servicing and replacement by a rotation of the drain trap assembly in the opposite direction.

Another object of this invention is to provide a drain trap or check valve assembly of the foregoing characteristics which includes a float controlled valve wherein the weight of the float itself is partially or completely compensated.

Another object of this invention is to provide a drain trap assembly of the foregoing characteristics which includes a float construction which is compact and self-contained and wherein the compensating portion of the float may be easily protected against the liquid in which the float normally operates. The float embodied in the present invention may be constructed in such manner that compensating means are completely protected from the liquid in which the float operates, which makes it possible to use floats having suitable surfaces in liquids which are highly corrosive.

Other objects will become apparent as this description progresses.

In the drawings:

Fig. 1 is a top plan view of the drain trap of this invention secured to the fitting.

Fig. 2 is a cross-sectional view taken on lines 2—2 of Fig. 1.

Fig. 3 is an elevational view similar to Fig. 2.

Fig. 4 is a perspective view partly in section showing the manner of locking the drain trap assembly to the drain pipe fitting.

Fig. 5 is a top plan view of a floor drain housing.

Fig. 6 is a top plan view showing the drain trap assembly of this invention secured to a floor drain housing.

Fig. 7 is a cross-sectional view taken on lines 7—7 of Fig. 6.

Fig. 8 shows a cross-sectional view of the drain trap assembly of this invention secured to another type of fitting connection, and Fig. 9 is a view showing the arrangement similar to Fig. 8 but with a housing which includes as an integral part thereof a goose neck end.

The construction shown in Figs. 1 to 4 will be first described. This construction is adapted for sinks and the like. It comprises a fitting generally indicated at 10 comprising a shell-like body portion 12, an annular bottom 14 and a reduced tubular extension 16 which is formed with an inwardly extending annular lip or ring 17. A flange 18 extends outwardly of the body portion 12.

The body portion 12 is externally threaded as at 20 and is internally provided with spaced ribs 22. The tubular extension 16 is externally threaded as at 24. The fitting 10 is positioned in the usual outlet opening of the sink basin 26, as best shown in Fig. 2, and is secured therein by a threaded ring 28. Suitable gaskets 30 are interposed as is well understood in the art. Threadedly secured to the tubular extension 16 is the neck 32 of a housing generally indicated at 34, which housing has a bulbous portion 36 and a depending extension 38 which is connected to the drain pipe, not shown.

The tubular extension 16 is provided with a pair of inwardly extending pins, lugs or projections 40 diametrically positioned opposite each other.

The removable drain trap assembly which is generally indicated at 42 includes a cylindrical shaped body member 44 having an annular flange 46 at the top thereof. The flange 46 has a pair of diametrically spaced cutouts or recesses 48 which when alined with the projections or pins 40 permit the body member 44 and the entire drain trap assembly 42 to be inserted from the top so that the flange 46 can rest on the annular ring or lip 17. A washer 50 is interposed therebetween.

The upper surface of the flange 46 has a pair of cam shaped members generally indicated at 52 diametrically positioned on the flange. Each cam shaped member 52, starting from adjacent the opposite cutouts 48, slopes or inclines upwardly to a common hight spot 54. The cam shaped members 52 do not occupy or cover the top surface of the flange 46 but extend upwardly of the flange adjacent the outer wall surface thereof so that by viewing the flange from a top view the flange will appear flat except for the cam shaped members 52 extending around the outer circumference of the flange.

After the drain trap assembly 42 is inserted in the opening of the fitting 10 by alining the cutouts 48 of the flange with the pins or projections 40, the flange 46 will rest on the annular lip or ring 17 as a support. By merely turning the cylindrical shaped body member 44 of the assembly slightly either clockwise or counterclockwise the cammed members 52 will engage the pins or projections 40 and lock the body member 44 and the assembly in position to the fitting. It is not necessary to turn the body member 44 of the assembly to the high spots of the cam members as a locking will be effected by engagement of the pins or projections with any portion of the cammed members. The assembly when thus locked will remain in locked position until it is desired to manually remove the assembly for servicing or replacement and this may be readily accomplished by manually rotating the assembly slightly in the opposite direction until the flange cutouts 48 are in alinement with the pins or projections 40, after which the assembly may be bodily lifted upwardly out of the fitting. Both the installation and removal of the drain trap assembly may be readily and quickly accomplished without the use of tools or the like.

Extending across the top of the cylindrical body member 44 is a bridge or cross-member 56 which may be formed integrally with the body member 44. The body member 44 of the assembly has its bottom end finished to provide a valve seat 58.

The bridge 56 is provided with a central boss 60 having threaded recess 62. Cooperating with threaded recess 62 is stem 63 having its top end suitably threaded. Stem 63 extends axially of assembly 42 and has its end shaped into screw head 64. Head 64 is preferably larger than stem 63. The length of stem 63 may vary within wide limits and as will be shown later depends upon the range of travel of the float and the type of liquid to be controlled.

Symmetrically disposed with respect to stem 63 and cooperating therewith is float member generally indicated at 66. The float member which is connected to the cylindrical body member 44 is considered to be a part of the drain trap assembly or drain trap unit. Float member 66 consists of float chamber 68 having bottom 69 and neck 70. Float member 66 may have any desired shape and any desired dimension and may be of any suitable material. Within float 66 is sealed chamber 72 containing a quantity of air. It is understood that chamber 72 may contain any other gas or liquid or may be evacuated. In any event, chamber 72 provides the buoyancy.

Rigidly attached to float member 66 is sleeve 74. Sleeve 74 is sealed from chamber 72 and is of suitable material. In normal float operation sleeve 74 is vertical and may extend as far into float chamber 68 as desired. As shown, the sleeve 74 extends through to bottom wall 69 of the float member. If float member proper 66 is very long or if the range of travel of the float is short in comparison to the length of the float, then sleeve 74 need not extend to bottom wall 69 of the float but may terminate at any desired point. In any event, however, it is to be understood that the bottom of sleeve 74 must be sealed to provide proper separation from the region within sleeve 74 and buoyant chamber 72.

In the assembled position of the float within housing 34, stem head 64 and a portion of stem 63 will always be disposed within sleeve 74. Disposed around stem 63 within sleeve 74 is coil spring 76.

Coil spring 76 is small enough so that stem head 64 will stop the bottom end of the spring. The top end of coil spring 76 is kept within sleeve 74 by suitable means, such as for example bushing 78 having a suitable shoulder. Bushing 78 is dimensioned so that stem 63 is freely slidable through the bushing. Bushing 78 may have sufficient length along the axis of stem 63 so that the bushing will provide suitable support against bending of stem 63.

The characteristics of spring 76 will be determined by the dead weight of float 66, the buoyancy characteristics of the float in the liquid, the point at which the weight of the float is to be neutralized or compensated and whether compensation is to be partial, complete or whether overcompensation is to be provided. Different springs having different characteristics make it possible to adapt the construction for different purposes.

The float 66 has curved wall portion 80 which is adapted to cooperate with valve seat 58 for effecting closure of the valve when the float is in elevated position, as illustrated in Fig. 2.

Instead of having sleeve 74 within float chamber 68, it may be disposed either above or below the float but in line therewith. If sleeve 74 is disposed above float 66, then float chamber 68 need not have any portion thereof taken up by the sleeve. On the other hand if sleeve 74 extends below float 66, it will be necessary to provide a sleeve or channel through which stem 63 may pass and along which the float may move.

The valve body depends into the interior of the housing. In the form of the invention illustrated in Figs. 1 and 2, liquid may be introduced through the top passing through the fitting 10 into housing 34 providing the level of liquid 82 is low. Irrespective of where liquid 82 is introduced into housing 34, such as from the top or from some other part of housing 34, which is not shown, such as from the backup flow, the construction illustrated in Figs. 1 and 2 provides for valve closure when the level of liquid 82 has reached a desired point.

It will be clear that the stem and the sleeve forming part of the float structure will both cooperate to guide the float to move in a straight vertical path. By having a long bearing surface between the stem and bushing, strong lateral support will be provided while permitting the float to move freely up and down. The screw head 64 of the stem may fit snugly in sleeve 74 and will function as a pump to eliminate any liquid which may enter the sleeve. Furthermore, liquid damping of the float may also be provided if liquid is present in sleeve 74.

The pumping action of the stem head in the sleeve will keep the sleeve clean and free from sediment. If desired, a water-tight seal for the stem head may be provided.

As herebefore described, float 66 is symmetrically disposed with respect to stem 63. This is desirable to prevent binding and insure smooth operation. However, a non-symmetrical disposition may readily be used and in many instances will work substantially as well.

The construction shown in Figs. 5 to 7 inclusive will now be described. The floor drain housing generally indicated at 84 is suitably secured in the recessed floor, as is well understood, and is provided with a grating 86 pivotally secured as at 87. The floor drain housing has a central opening 88 which is internally threaded as at 89. The floor drain housing is connected to a pipe or conduit 85.

A fitting generally indicated at 90 comprises a cylindrical shaped body portion 91 and a flange 92. The body portion 91 is externally threaded as at 93 for threaded engagement with the floor drain housing 84. The inside of the fitting is provided with an upper enlarged bore section 94 and a reduced bore section 95 with a shoulder 96 therebetween. The upper bore section 94 is provided with a pair of inwardly extending pins, lugs or projections 40a, diametrically positioned opposite each other. These are similar to the projections 40 heretofore described in connection with Figs. 1 to 4 inclusive.

The removable drain trap assembly which is generally indicated at 42a is identical to the removable drain trap assembly 42 heretofore described in connection with Figs. 1 to 4 and will not be redescribed in detail. The cylindrical shaped body member 44a of said assembly has an annular flange 46a at the top thereof. The flange has a pair of diametrically spaced cutouts or recesses 48a which when alined with the projections or pins 40a permit the assembly to be inserted from the top so that the flange can rest on the shoulder. The upper surface of the flange 46a has a pair of cam shaped members 52a identical to the cam shaped members 52 for locking the assembly in the same manner heretofore described. The drain trap assembly may be removed as a unit in the same manner previously described. The drain trap assembly 42a and float valve assembly 66a operate in the same manner as the drain trap assembly previously described.

Fig. 8 shows the drain trap of this invention applied to another type of fitting connection.

A T-shaped fitting generally indicated at 100 is provided with an upper open end which has a shoulder 102. A pair of projections or pins 104 extend inwardly above the shoulder. A plug or closure 106 for closing said opening is provided with a pair of spaced cammed surfaces 108 and spaced cutouts 110, which are alined with the projections 104 to permit insertion of the plug or closure 106. The closure is rotated slightly for locking with said projections.

The extension 112 of the T-shaped fitting 100 is suitably connected to pipes or conduits (not shown) connected to a bathtub or lavatory or to a laundry tub or series of such objects. The lower end of the T-shaped fitting is externally threaded as at 114 to threadedly receive an internally threaded fitting generally indicated at 116.

The fitting 116 has an annular lip 118 at the lower end thereof, similar to lip 17. It is also provided with a pair of diametrically spaced projections 40b, similar to projections 40. The removable drain trap assembly generally indicated at 42b is identical to the removable drain trap 42 heretofore described in connection with Figs. 1 to 4, or the assembly 42a described in connection with Figs. 6 to 7 and is inserted and secured in the same manner heretofore described and is likewise removable in the same manner. It has the cam shaped locking arrangement therein shown. A housing 120 is sweated to the lower end of fitting 116 and the lower end of the housing is connected to a drain pipe, not shown.

Fig. 9 is generally similar to Fig. 8 and supports the drain trap assembly in the same manner described in connection with Fig. 8. However, in Fig. 9 the housing 122 which is secured at its upper end to the fitting 116 includes as an integral part thereof a goose neck portion generally indicated at 124, having a swivel end 126 which is suitably connected to a drain pipe, not shown.

It will be understood that various changes and modifications may be made from the foregoing without departing from the spirit and scope of the appended claims.

We claim:

1. In combination, a liquid drain assembly and a drain trap fitting, said drain trap fitting having locking projections therein, said drain trap assembly including a cylindrically shaped body portion having a flange thereon, said body portion being located within said drain trap fitting and a pair of oppositely positioned recesses in said flange whereby said recesses are aligned with said locking projections to permit installation of said body member and assembly into said fitting, a pair of oppositely positioned camming members on said flange, each of said camming members extending around the outer circumference of the flange and each camming member starting from adjacent the opposite recesses and sloping upwardly to a common point, whereby each said camming member engages one of said locking projections upon a slight rotation of said cylindrical shaped body member in either direction to effect a locking therebetween, a support member extending across the cylindrical shaped body portion having a valve seat at one end thereof, a float construction, said float construction comprising an elongated buoyant body having a valve seat engaging portion arranged for cooperation with said seat, a sleeve extending axially in said buoyant body, said sleeve being secured within said buoyant body and open at its top end, an elongated stem secured to the center of said support member and extending therefrom into said sleeve an amount sufficient to limit transverse movement of the sleeve and buoyant body with respect to the stem, a coil spring around said stem within said sleeve, and means on said stem and sleeve for retaining said coil spring in position around said stem, said stem being of a length and the spring being of such a construction that when the buoyant body is out of contact with the liquid the valve seat engaging portion thereof will be spaced from the valve seat an amount sufficient that it will not obstruct the flow through said assembly.

2. A liquid drain assembly, including a cylindrical shaped body portion having a valve seat at one end thereof, a support member extending across the cylindrical shaped body portion, a float construction, said float construction comprising an elongated buoyant body having a valve seat engaging portion arranged for cooperation with said seat, a sleeve extending axially in said buoyant body, said sleeve being secured within said buoyant body and open at its top end, an elongated stem secured to the center of said support member and extending therefrom into said sleeve an amount sufficient to limit transverse movement of the sleeve and buoyant body with respect to the stem, a coil spring around said stem within said sleeve, and means on said stem and sleeve for retaining said coil spring in position around said stem, said stem being of a length and the spring being of such a construction that when the buoyant body is out of contact with the liquid the valve seat engaging portion thereof will be spaced from the valve seat an amount sufficient that it will not obstruct the flow through said assembly.

References Cited in the file of this patent

UNITED STATES PATENTS

| | | |
|---|---|---|
| 925,859 | Axford | June 22, 1909 |
| 1,182,524 | Berg et al. | May 9, 1916 |
| 2,049,909 | Kirschner | Aug. 4, 1936 |
| 2,843,146 | Kirschner | July 15, 1958 |